(12) United States Patent
Kubota et al.

(10) Patent No.: US 11,089,893 B2
(45) Date of Patent: Aug. 17, 2021

(54) DRINKING CONTAINER WITH BARRIER SYSTEM

(71) Applicant: Green Sprouts, Inc., Asheville, NC (US)

(72) Inventors: Emi Kubota, Asheville, NC (US); Becky B. Cannon, Asheville, NC (US)

(73) Assignee: Green Sprouts, Inc., Asheville, NC (US)

(*) Notice: Subject to any disclaimer, the term of this patent is extended or adjusted under 35 U.S.C. 154(b) by 119 days.

(21) Appl. No.: 16/587,954

(22) Filed: Sep. 30, 2019

(65) Prior Publication Data

US 2021/0093110 A1    Apr. 1, 2021

(51) Int. Cl.
| | |
|---|---|
| A47G 19/22 | (2006.01) |
| A61J 11/00 | (2006.01) |
| B01D 29/03 | (2006.01) |
| B01D 35/02 | (2006.01) |
| A61J 9/06 | (2006.01) |

(52) U.S. Cl.
CPC ........ *A47G 19/2272* (2013.01); *A61J 9/0623* (2015.05); *A61J 11/008* (2013.01); *A61J 11/0025* (2013.01); *B01D 29/03* (2013.01); *B01D 35/02* (2013.01); *A47G 19/2211* (2013.01)

(58) Field of Classification Search
CPC ............ A47G 19/2272; A47G 19/2266; A47G 19/2211; A61J 11/0025
USPC ........................................................ 215/229
See application file for complete search history.

(56) References Cited

U.S. PATENT DOCUMENTS

| | | | | |
|---|---|---|---|---|
| 1,204,171 | A | | 11/1916 | Mckay |
| 1,847,879 | A | * | 3/1932 | Knecht ................ A47G 21/181 239/33 |
| 5,478,467 | A | * | 12/1995 | LeMire ..................... C02F 1/50 210/206 |
| 6,314,866 | B1 | * | 11/2001 | Melton ................... A47G 19/16 426/433 |
| 8,777,044 | B1 | * | 7/2014 | Raymus ............. A47G 19/2272 220/526 |
| 9,988,177 | B1 | * | 6/2018 | Ruprecht ............. B65D 47/122 |
| 2004/0173556 | A1 | * | 9/2004 | Smolko ..................... F28D 5/00 215/11.5 |
| 2008/0305226 | A1 | | 12/2008 | Catena et al. |

(Continued)

FOREIGN PATENT DOCUMENTS

| | | |
|---|---|---|
| CN | 88211712 U | 12/1988 |
| CN | 200998428 Y | 1/2008 |
| GB | 2382069 A | 5/2003 |

*Primary Examiner* — James N Smalley
*Assistant Examiner* — Jennifer Castriotta
(74) *Attorney, Agent, or Firm* — Luedeka Neely Group, PC

(57) ABSTRACT

A barrier system for a container, includes a fluid permeable solids barrier comprising an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port. The system also includes a straw having an upper end configured to fittingly engage the lower port of the fluid permeable solids barrier spout; and a spout having a lower port configured to fittingly engage the upper port of the fluid permeable solids barrier.

14 Claims, 5 Drawing Sheets

(56) References Cited

U.S. PATENT DOCUMENTS

| | | | | |
|---|---|---|---|---|
| 2012/0285843 A1* | 11/2012 | Devlin | ................ | B65D 51/246 |
| | | | | 206/221 |
| 2015/0329255 A1* | 11/2015 | Rzepecki | ........... | B65D 47/0885 |
| | | | | 222/189.06 |
| 2019/0274457 A1* | 9/2019 | Robertson | ............ | B65D 47/089 |

* cited by examiner

DRINKING CONTAINER WITH BARRIER SYSTEM

FIELD

This disclosure relates to drinking containers. More particularly, this disclosure relates to a drinking container for infants and toddlers having a barrier system that includes a fluid permeable solids barrier.

BACKGROUND

Improvement is desired in drinking containers and, in particular, bottles used by babies and toddlers. It is desirable to use liquid holding containers made of glass. Plastic and metal containers can impart undesirable tastes to liquids. However, glass can break and pose a danger, particularly to a baby or toddler.

Accordingly, what is desired is an improved drinking container that is constructed to include a fluid permeable/solids impermeable barrier that serves to inhibit the passage of solids, such as broken glass, from the drinking container to the user.

The present disclosure advantageously improves over previous attempts to provide such a drinking container and a fluid permeable solids barrier for use with drink containers.

SUMMARY

The above and other needs are met by a drinking containers and barrier systems according to the disclosure.

In one aspect, a drinking container according to the disclosure includes a cup having an open top; a spout configured for passage of fluid from the cup to a port on an upper portion of the spout; and a fluid permeable solids barrier positionable between the spout and the open top of the cup.

The fluid permeable solids barrier comprising an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port.

In another aspect, a drinking container kit according to the disclosure includes a cup having an open top and a fluid permeable solids barrier positionable over the open top of the cup. The fluid permeable solids barrier has an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port.

The kit also includes a first drinking spout and a second drinking spout, each installable over the fluid permeable solids barrier. The first drinking spout includes a straw having an upper end configured to fittingly engage the lower port of the fluid permeable solids barrier spout and a straw spout having a lower port configured to fittingly engage the upper port of the fluid permeable solids barrier. The second drinking spout has a spout body having an upper port extending upwardly from the spout body, and a lower edge of the body configured as an annular ring.

The first drinking spout and the second drinking spout are interchangeably positionable over the fluid permeable solids barrier so that a user may utilize either the first drinking spout or the second drinking spout.

In yet a further aspect, a barrier system according to the disclosure, includes a fluid permeable solids barrier comprising an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port. The system also includes a straw having an upper end configured to fittingly engage the lower port of the fluid permeable solids barrier spout; and a spout having a lower port configured to fittingly engage the upper port of the fluid permeable solids barrier.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
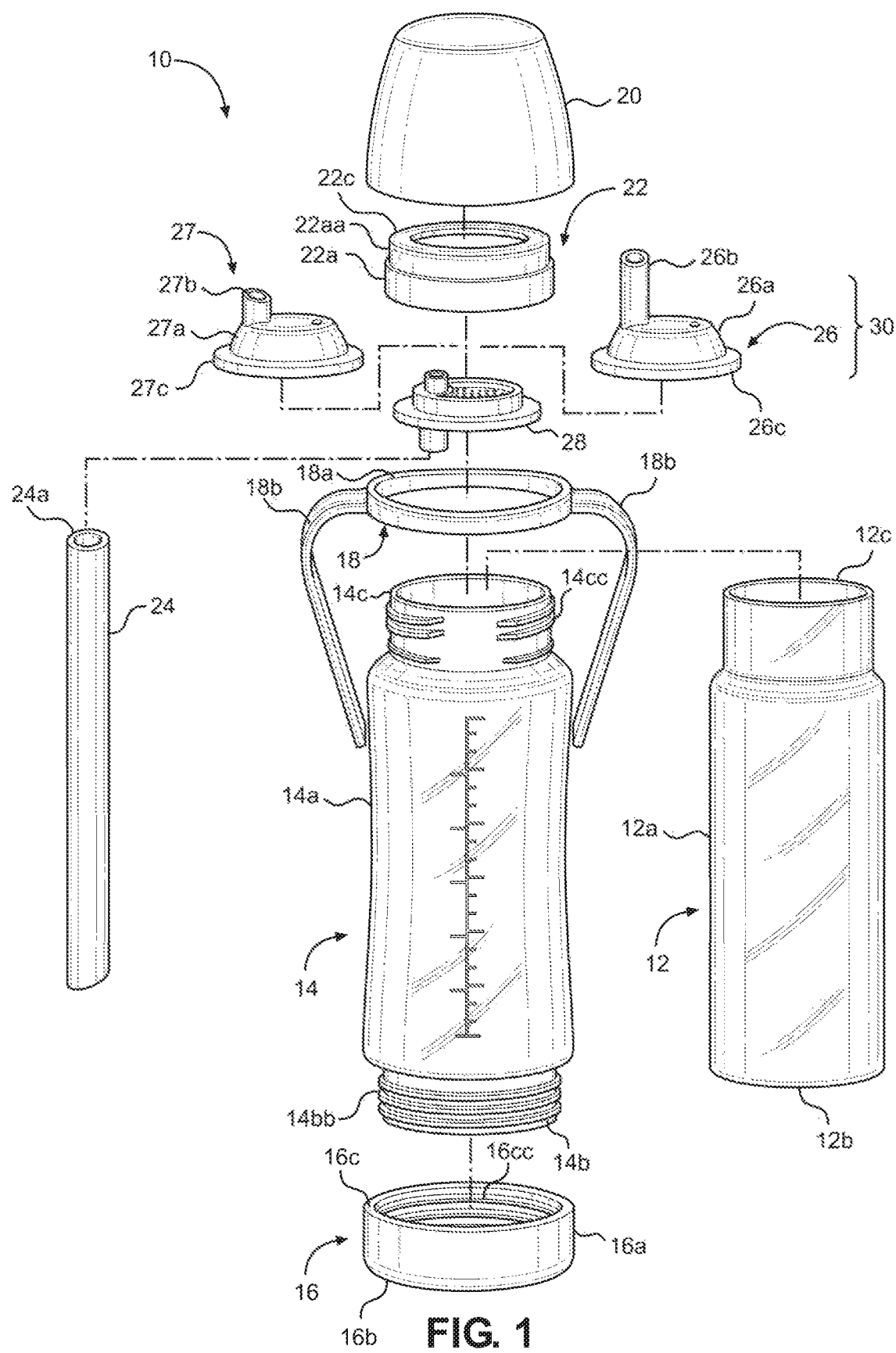
FIG. 1 is an exploded perspective view of a drinking container having a barrier system according to the disclosure.
Figure 2:
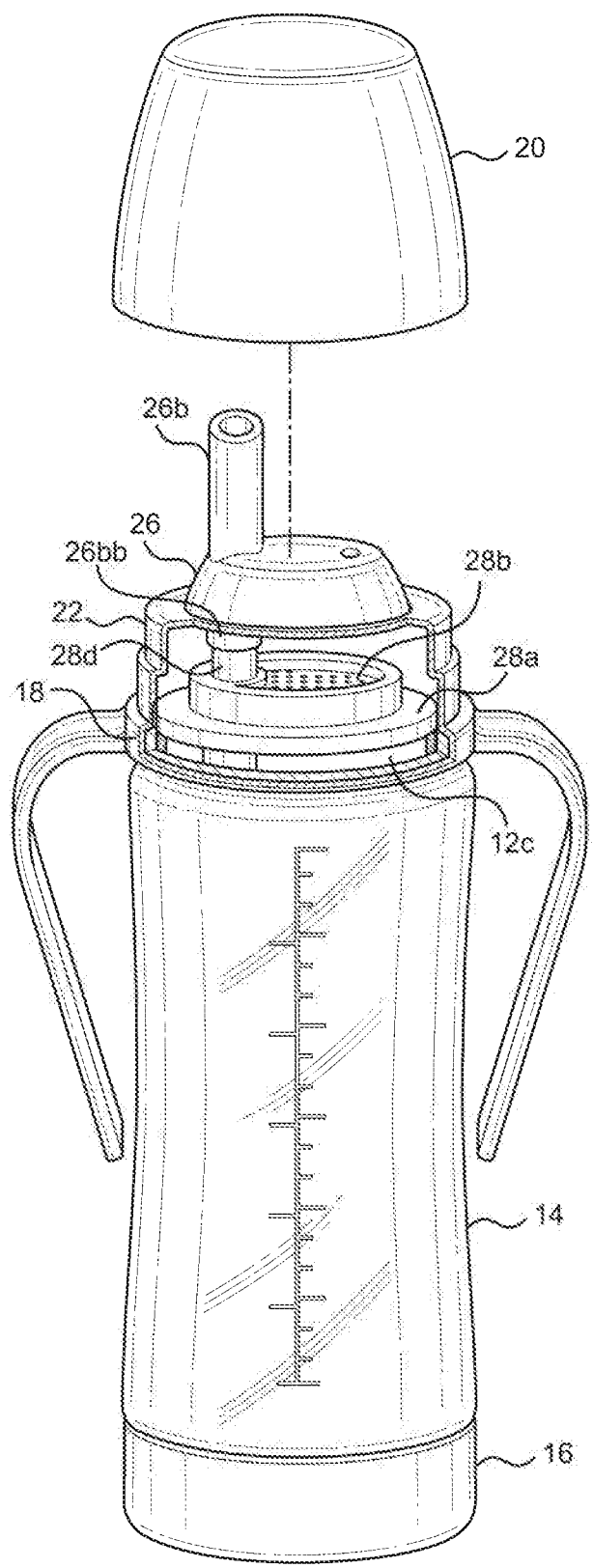
FIG. 2 shows the drinking container of FIG. 1 assembled.

With initial reference to FIG. 1 a drinking container 10 according to the disclosure is shown. The drinking container 10 is particularly configured for use by a baby or toddler to consume fluids. As shown, the drinking container 10 is provided as a kit that includes an inner glass cup 12, an outer plastic shield 14, a base 16, handles 18, a cap 20, a collar 22, a straw 24, a straw spout 26, a sippy spout 27, and a fluid permeable solids barrier 28.

The top 22, straw 24, sippy spout 27, straw spout 26, and the fluid permeable solids barrier 28 cooperate to provide a fluid permeable solids barrier system 30 of the drinking container 10. All of the components utilized in the drinking container 10 are desirably dishwasher safe and made of materials that do not have potential harmful health affects or are irritating to babies and toddlers.

The appearance of the drinking container 10 and the barrier system 30 are also configured to be aesthetically pleasing and includes various ornamental aspects and features.

The inner glass cup 12 is made of glass and is configured to hold a liquid for consumption by a baby or toddler. The cup 12 has a continuous curved solid sidewall 12a, a solid bottom 12b, with an open top 12c.

The outer plastic shield 14 is configured to receive the inner glass cup 12 to insulate and to help protect the glass cup 12 from breakage. The outer plastic shield 14 includes a continuous curved solid sidewall 14a, an open bottom 14b having external threads 14bb, with an open top 14c having external threads 14cc. The bottom 14b and the top 14c preferably are of reduced dimension as compared to the sidewall 14a.

The base 16 is made of rubber or the like to be shock-absorbing and non-slip. The base 16 is configured to screw onto the bottom 14b of the outer plastic shield 14. The base 16 includes a continuous curved sidewall 16a, a closed bottom 16b preferably including a central safety release outlet, and an open top 16c having internal threads 16cc configured to threadably engage the external threads 14bb of the open bottom 14b.

The handles 18 include a ring 18a configured to slip over the open top 14c of the outer plastic shield 14 and rest on the top of the sidewall 14a. A pair of grips 18b extend downwardly from opposite sides of the ring 18a to be situated adjacent the sidewall 14a when the handle 18 is installed for grasping by a user. The ring 18a is held in place on the plastic shield 14 by the collar 22 when the collar 22 is screwed onto the top 14c of the plastic shield 14.

The cap 20 is made of plastic and configured as a blind bore to snap-fit over the collar 22 with sufficient clearance for the straw spout 26 or the sippy spout 27. The cap 20 covers and protects the spout that is on the container 10 such as during travel and the like.

The collar 22 is made of plastic and configured to screw onto the top 14c of the plastic shield 14. The collar 22 has continuous curved sidewalls 22a and 22aa, an open bottom 22b having internal threads 22bb for threadably engaging the external threads 14cc of the outer plastic shield 14, and an open top 22c in the form of an annular ring configured to overlie annular edge portions of the spouts 26 and 27. The sidewall 22aa is of smaller dimension to fittingly receive the cap 20, with the cap 20 sitting on the uppermost edge of the larger sidewall 22a.

The straw 24 is of one-piece cylindrical construction. The straw 14 is preferably a length of silicone tubing. The straw 24 has an upper end 24a that is configured to fittingly mate with a portion of the fluid permeable solids barrier 28 as explained more fully below.

The straw spout 26 is preferably of one-piece molded construction and is made of silicone. The straw spout 26 includes a bulbous body 26a having a straw-shaped upper port 26b extending upwardly from the body 26a and a corresponding lower port 26bb extending below the body 26a. The area below the bulbous body 26a is open and a lower edge of the bulbous body 26 is configured as an annular ring 26c. The lower port 26bb is configured to fittingly mate with a portion of the fluid permeable solids barrier 28 as explained more fully below.

The sippy spout 27 is similar to the straw spout 26, but the sippy spout 27 is not used with the straw. As such, the sippy spout 27 does not include a lower port along the lines of the lower port 26bb. In this regard, the sippy spout 27 includes a bulbous body 27a having an upper port 27b extending upwardly from the body 26a, and a lower edge of the bulbous body 27 is configured as an annular ring 27c.

The fluid permeable solids barrier 28 is configured to work with both the straw spout 26 in conjunction with the straw 24, and also the sippy spout 27 without the straw 24. The fluid permeable solids barrier 28 functions as a barrier to keep solid objects, such as broken glass and the like, from passing from the inner glass cup 12 or outer plastic shield 14 to the upper port 26b of the spout 26 or the upper port 27b of the spout 27, The fluid permeable solids barrier 28 is preferably of one-piece molded construction and is made of silicone. The fluid permeable solids barrier 28 includes an annular outer flange 28a surrounding a central fluid permeable sieve 28b that is vertically displaced from the flange 28a by a step 28c. An upper port 28d is located at an interior edge of an upper side of the flange 28a and provides a fluid flow path continued to a lower port 28dd on the opposite lower side of the flange 28a. A fluid permeable sieve 28e is located in the flow path between the upper port 28d and the lower port 28dd.

Thus, the fluid permeable solids barrier 28 is advantageously configured to be able to be used with drinking structures utilizing a straw, such as the straw spout 26, and drinking structures not utilizing a straw, such as the sippy spout 27. In addition, instead of the sippy spout 27, a nipple may be utilized in place of the sippy spout, with the barrier 28 also being compatible with the nipple.

Figure 3:
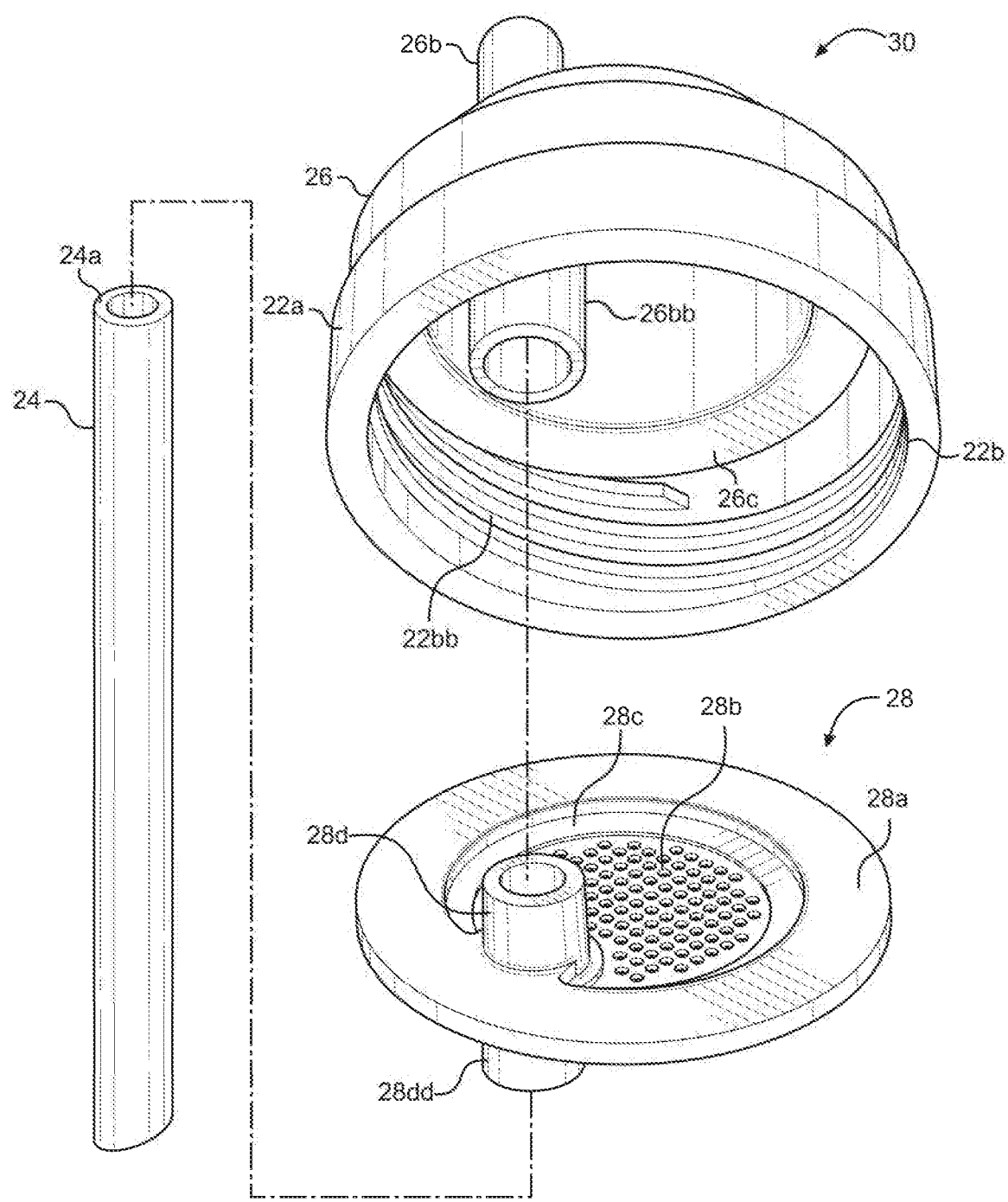
FIG. 3 is a detailed exploded view showing components of the drinking container of FIG. 1.
Figure 4:
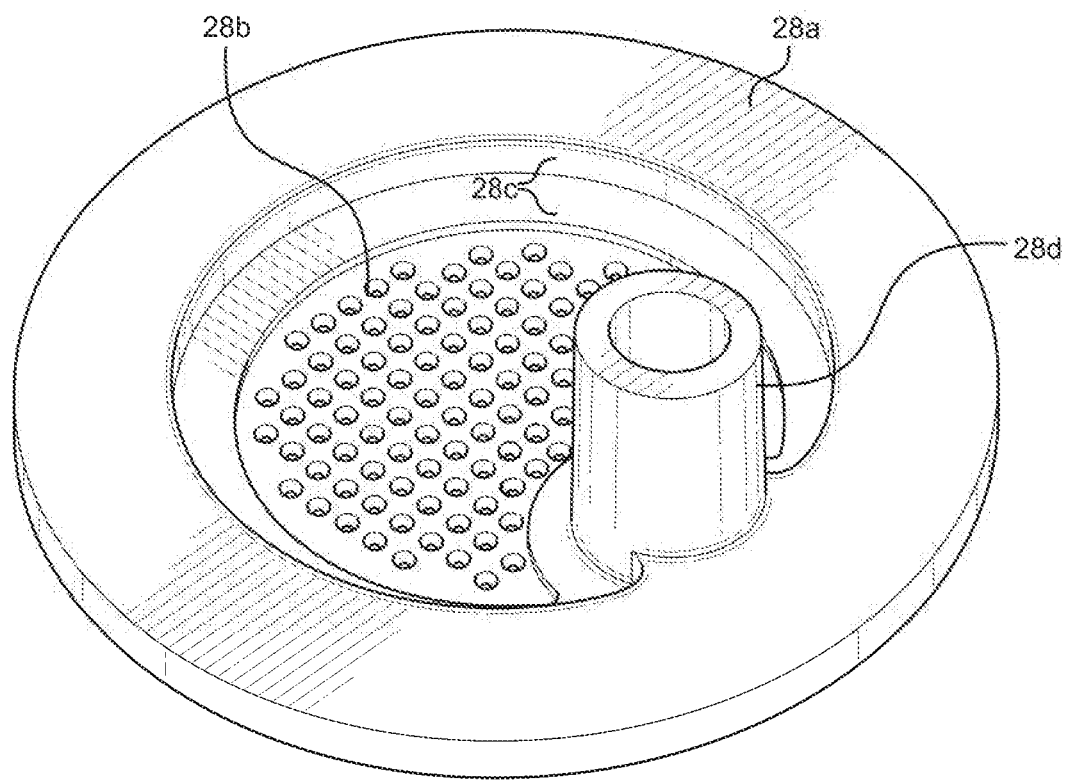
FIG. 4 is an upper perspective view of a fluid permeable solids barrier of the barrier system of the disclosure.
Figure 5:
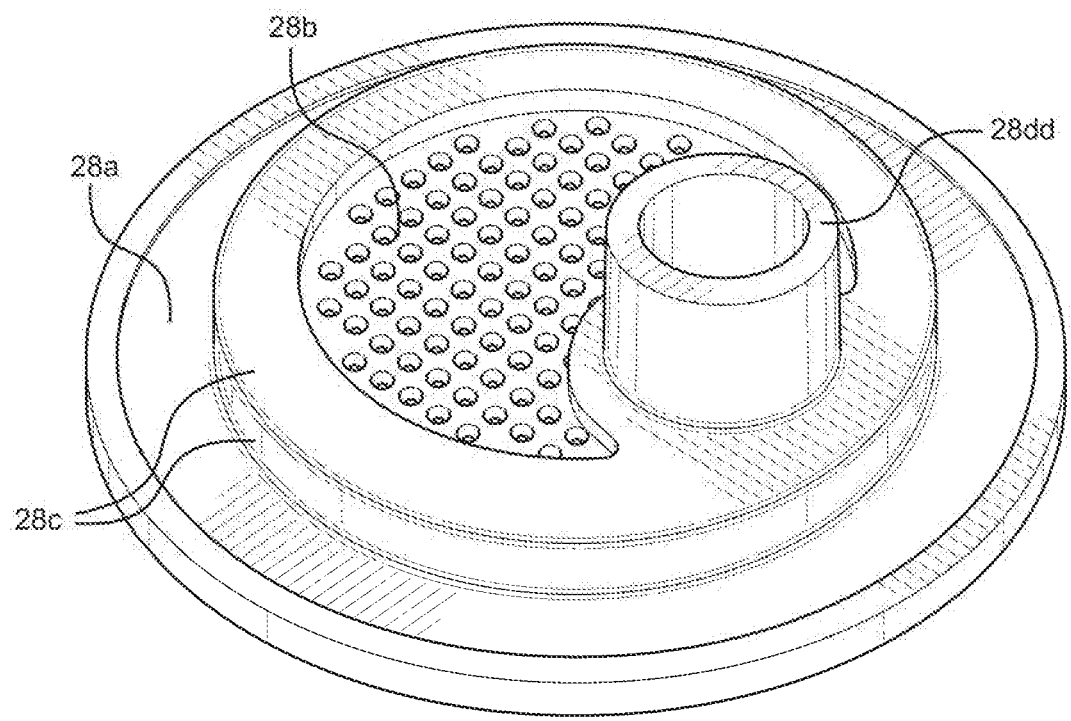
FIG. 5 is a lower perspective view of the fluid permeable solids barrier of the barrier system of the disclosure.
Figure 6:
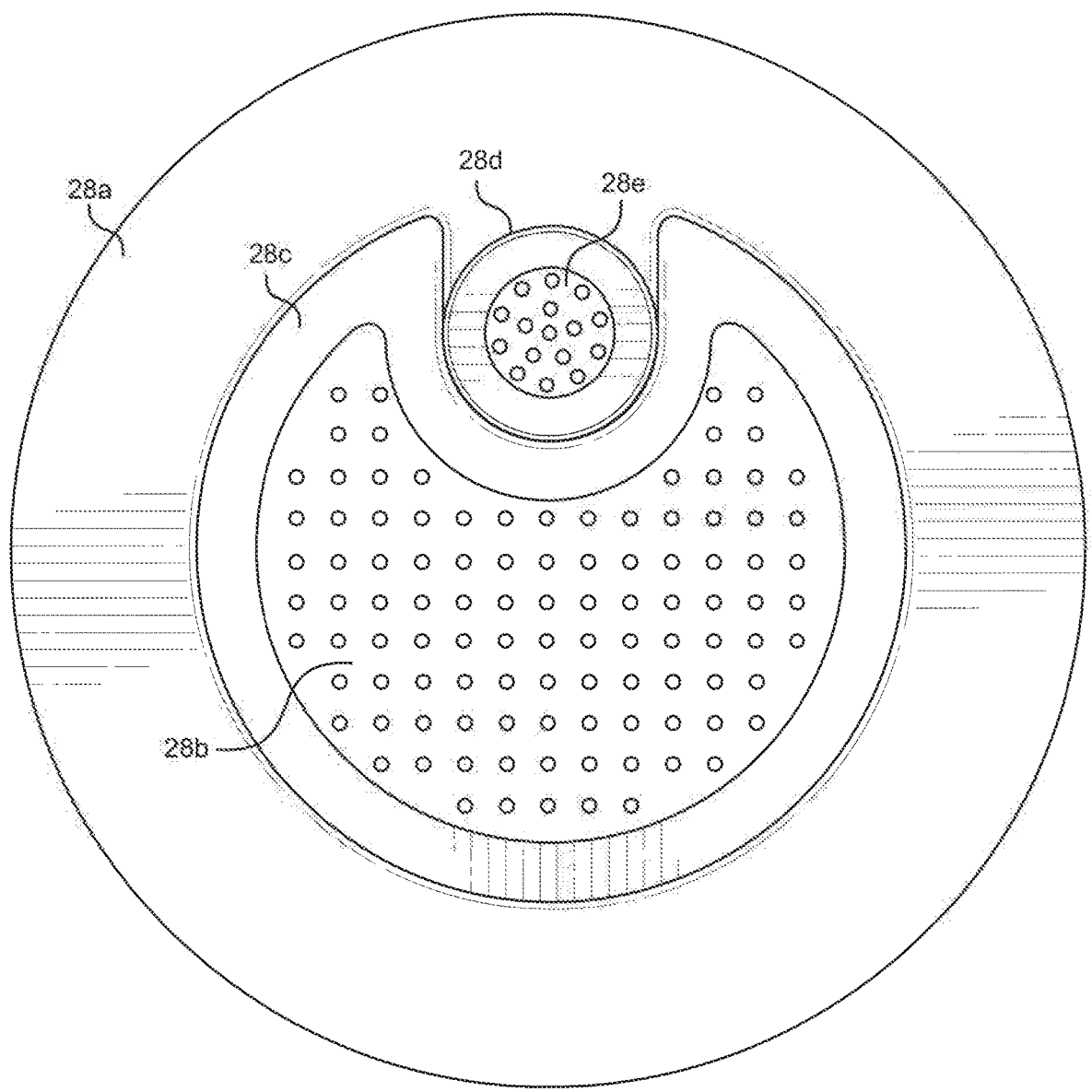
FIG. 6 is an upper plan view of the fluid permeable solids barrier.

For example, when the solids barrier 28 is used with the straw 24 and the straw spout 26, the upper end 24a of the straw 24 is fittingly engaged with the lower port 28dd of the barrier 28. The lower port 26bb of the straw spout 26 is fittingly engaged with the upper port 28b of the solids barrier 28. As installed, this will also align the annular ring 26c of the straw spout 26 over the annular flange 28a of the solids barrier 28. This is shown, for example in FIG. 3.

As will be appreciated, the solids barrier 28 not only has the central fluid permeable sieve 28b located between the glass cup 12 and the spout 26, but also includes the fluid permeable sieve 28e located in the flow path between the upper port 28d and the lower port 28dd, which represents the drinking flow path when the straw 24 and the straw spout 26 are used. Thus, the barrier 28 serves to inhibit the passage of any solids, such as broken glass, from the cup 12 or the shield 14 to the person drinking via the spout 26.

When the solids barrier 28 is used with the sippy spout 27, which does not utilize the straw, the spout 27 is simply positioned over the barrier 28 by aligning the annular ring 27c of the spout 27 over the annular flange 28a of the solids barrier 28. As the drinking flow path is broader, it will be appreciated that the central fluid permeable sieve 28b and the fluid permeable sieve 28e protect the flow path from passage of solids, such as broken glass, from the cup 12 or the shield 14.

The container 10 is assembled by inserting the glass insert 12 into the shield 14 via the open bottom 14b of the shield 14 with the open top 12c of the glass insert 12 oriented to align with the open top 14c of the shield 14. The base 16 is then screwed onto the open bottom 14b of the shield 14. Next, the handle 18 is placed over the open top 14c of the shield 14. The solids barrier 28 is then installed on either the straw spout 26 and the straw 24, or the sippy spout 27, as explained above, and the barrier 28 is installed onto the glass cup 12 with the lower side of flange 28a atop the open top 12c of the glass cup 12 which is within the shield 14. The collar 22 is then screwed onto the top of the shield 14, with the spout 26/27 extending out of the open top 22c of the collar 22.

To disassemble the container 10, the base 16 is unscrewed from the bottom 14b of the shield 14 and the glass insert 12 is removed from the open bottom 14b of the shield 14. Next, the collar 22 is unscrewed from the top 14c of the shield 14 and the handle 18 removed. The spout 26/27 and the solids barrier 28 may then be removed.

Accordingly, it will be appreciated that present disclosure provides an improved drinking container that is constructed to include a fluid permeable/solids impermeable barrier that serves to inhibit the passage of solids, such as broken glass, from the drinking container to the user. The barrier is versatile and can be used in one configuration of the container that incorporates a straw and in another configuration that does not include a straw. In both cases, a solids barrier is provided. For example, the barrier is configured to include a solids barrier between the straw and the spout to provide a continuous straw structure that incorporates a solids barrier, while still providing a surrounding solids barrier outside of the straw. The same barrier is also able to be utilized with spout structures, including nipples, that do not utilize a straw.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A drinking container, comprising:
a cup having an open top;
a spout configured for passage of fluid from the cup to a port on an upper portion of the spout; and
a fluid permeable solids barrier positionable between the spout and the open top of the cup, the fluid permeable solids barrier comprising an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port.

2. The drinking container of claim 1, wherein the central fluid permeable sieve is vertically displaced from the outer flange.

3. The drinking container of claim 1, further comprising a collar positionable over a portion of the spout and securable adjacent the open top of the cup.

4. The drinking container of claim 1, further comprising a shield container surrounding the cup.

5. The drinking container of claim 1, further comprising a straw having an upper end configured to fittingly engage the lower port of the fluid permeable solids barrier, and wherein the spout includes a lower port configured to fittingly engage the upper port of the fluid permeable solids barrier.

6. The drinking container of claim 1, wherein the fluid permeable solids barrier is of one-piece construction and made of silicone.

7. A drinking container kit, comprising:
a cup having an open top;
a fluid permeable solids barrier positionable over the open top of the cup, the fluid permeable solids barrier comprising an outer flange surrounding a central fluid permeable sieve;
an upper port located at an interior edge of an upper side of the outer flange, a lower port on an opposite lower side of the outer flange in fluid communication with the upper port by a flow path therebetween, and a fluid permeable sieve located in the flow path between the upper port and the lower port;
a first drinking spout installable over the fluid permeable solids barrier, the first drinking spout comprising a straw having an upper end configured to fittingly engage the lower port of the fluid permeable solids barrier and a straw spout having a lower port configured to fittingly engage the upper port of the fluid permeable solids barrier, and
a second drinking spout installable over the fluid permeable solids barrier, the second drinking spout comprising a spout body having an upper port extending upwardly from the spout body, and a lower edge of the body configured as an annular ring,
the first drinking spout and the second drinking spout being interchangeably positionable over the fluid permeable solids barrier so that the user may utilize either the first drinking spout or the second drinking spout.

8. The kit of claim 7, wherein the central fluid permeable sieve is vertically displaced from the outer flange.

9. The kit of claim 7, further comprising a collar positionable over a portion of the first drinking spout or the second drinking spout and securable adjacent the open top of the cup.

10. The kit of claim 7, wherein the cup is made of glass and the kit further comprises a shield container surrounding the cup.

11. The kit of claim 7, wherein the fluid permeable solids barrier is of one-piece construction and made of silicone.

12. A barrier system for a container, comprising:
a fluid permeable solids barrier comprising an outer flange surrounding a central fluid permeable sieve; an upper port located at an interior edge of an upper side of the outer flange, a lower port on an opposite lower side of the outer flange in fluid communication with the upper port by a flow path therebetween, and a fluid permeable sieve located in the flow path between the upper port and the lower port;
a straw having an upper end configured to fittingly engage the lower port of the fluid permeable solids barrier; and
a spout having a lower port configured to fittingly engage the upper port of the fluid permeable solids barrier.

13. The system of claim 12, wherein the fluid permeable solids barrier is of one-piece construction and made of silicone.

14. The system of claim 12, wherein the central fluid permeable sieve is vertically displaced from the outer flange.

* * * * *